United States Patent
Hasegawa

(10) Patent No.: US 8,654,906 B2
(45) Date of Patent: Feb. 18, 2014

(54) RECEIVING DEVICE AND METHOD

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 13/037,905

(22) Filed: Mar. 1, 2011

(65) Prior Publication Data

US 2011/0216854 A1 Sep. 8, 2011

(30) Foreign Application Priority Data

Mar. 5, 2010 (JP) ................................. 2010-49825

(51) Int. Cl.
*H03D 1/04* (2006.01)

(52) U.S. Cl.
USPC ........... 375/346; 375/316; 375/260; 375/350; 370/206

(58) Field of Classification Search
None
See application file for complete search history.

(56) References Cited

U.S. PATENT DOCUMENTS

| | | | |
|---|---|---|---|
| 7,362,832 B2 | 4/2008 | Yoshida | |
| 7,697,410 B2 * | 4/2010 | Belotserkovsky et al. | ... 370/206 |
| 7,782,821 B2 | 8/2010 | Matsuo et al. | |
| 2005/0213692 A1 * | 9/2005 | Zhidkov | .......................... 375/346 |
| 2007/0253497 A1 * | 11/2007 | Chen | ............................... 375/260 |
| 2009/0213802 A1 | 8/2009 | Miki et al. | |

FOREIGN PATENT DOCUMENTS

| | | |
|---|---|---|
| JP | 2004-208254 A | 7/2004 |
| JP | 2004-235916 A | 8/2004 |
| JP | 2007-336496 A | 12/2007 |
| WO | WO-2006/104102 | 10/2006 |

* cited by examiner

Primary Examiner — Leon-Viet Nguyen
(74) Attorney, Agent, or Firm — Fujitsu Patent Center

(57) ABSTRACT

A receiving device includes a FFT unit performing FFT on an input signal of a time domain to transform the input signal into a plurality of signals of frequency domains and outputting the plurality of signals of the frequency domains, a signal extracting unit extracting a signal with a power that is greater than a threshold value from among the plurality of signals of the frequency domains output from the first FFT unit and outputting the extracted signal, an IFFT unit performing IFFT on the extracted signal output from the signal extracting unit, a subtracting unit subtracting the extracted signal output from the IFFT unit from the input signal and outputs a subtracted signal, and a second FFT unit transforming the subtracted signal output from the subtracting unit into a signal of the frequency domain by performing the FFT on the subtracted signal output from the subtracting unit.

11 Claims, 14 Drawing Sheets

RECEIVING DEVICE AND METHOD

CROSS-REFERENCE TO RELATED APPLICATIONS

This application is based upon and claims the benefit of priority from the prior Japanese Patent Application No. 2010-49825 filed on Mar. 5, 2010, the entire contents of which are incorporated herein by reference.

FIELD

The embodiments discussed herein are related to a receiving device and a receiving method.

BACKGROUND

An Orthogonal Frequency Division Multiplexing (OFDM) method is one of the conventional transmitting methods of a mobile radio communication system. The OFDM method is employed in a communication system such as, for example, Long Term Evolution (LTE), Super 3G, and Worldwide Interoperability for Microwave Access (WiMAX). In the OFDM method, a modulated signal is mapped in a frequency domain and is then transformed into a signal of a time domain. The signal of the time domain is transformed into a signal of the frequency domain by performing Fast Fourier Transform (FFT). For example, there is a receiving device that transforms each reception signal of a plurality of systems received by a plurality of reception antennas into a reception signal for each sub-carrier by performing the FFT. As an example of the above-described receiving device, there is a device that detects a delay time portion, which is longer than a guard interval of data, as an intersymbol interference portion, and that performs FFT processing on a result obtained by subtracting a replica of a time wave form portion of a known symbol that corresponds to the intersymbol interference portion (for example, Japanese Laid-open Patent Publication No. 2004-208254). Furthermore, there is a receiving device that generates a replica of interference components between the systems and cancels the interference components between the systems included in each reception signal by subtracting the replica from the reception signal of a plurality of systems after the FFT is performed (for example, Japanese Laid-open Patent Publication No. 2004-235916).

However, when the conventional receiving device performs the FFT on the reception signal, the sub-carriers may have different average powers for the sub-carriers after the FFT is performed. For example, if the received power of the sub-carrier allocated in a far terminal is larger than the received power of the sub-carrier allocated in a near terminal. In this case, if the number of bits of the FFT and level diagrams is not sufficiently secured, overflow occurs in the sub-carrier with the large power after the FFT is performed. On the other hand, the number of allocation bits is small in the sub-carrier with the small power, so that the accuracy of the FFT becomes lower. Regarding the sub-carrier with the large power, occurrence of overflow may be prevented by adjusting a level of an input signal to be subjected to the FFT. Even in this case, the sub-carrier with the small power may have a bad use efficiency of the number of bits, so that there is a problem that the number of bits used for the FFT is increased to achieve sufficient accuracy.

SUMMARY

According to an aspect of the invention, a receiving device includes a first Fast Fourier Transform (FFT) unit which performs FFT on an input signal of a time domain to transform the input signal into a plurality of signals of frequency domains and outputs the plurality of signals of the frequency domains, a signal extracting unit which extracts a signal with a power that is greater than a threshold value from among the plurality of signals of the frequency domains output from the first FFT unit and outputs the extracted signal, an Inverse Fast Fourier Transform (IFFT) unit which performs IFFT on the extracted signal output from the signal extracting unit, a subtracting unit which subtracts the extracted signal output from the IFFT unit from the input signal and outputs a subtracted signal, and a second FFT unit which transforms the subtracted signal output from the subtracting unit into a signal of the frequency domain by performing the FFT on the subtracted signal output from the subtracting unit.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

With reference to the diagrams, embodiments of a receiving device and a receiving method will be described in detail. In the descriptions of the embodiments, the same components are indicated with the same numerals, so that the overlapped descriptions are omitted.

Figure 1:
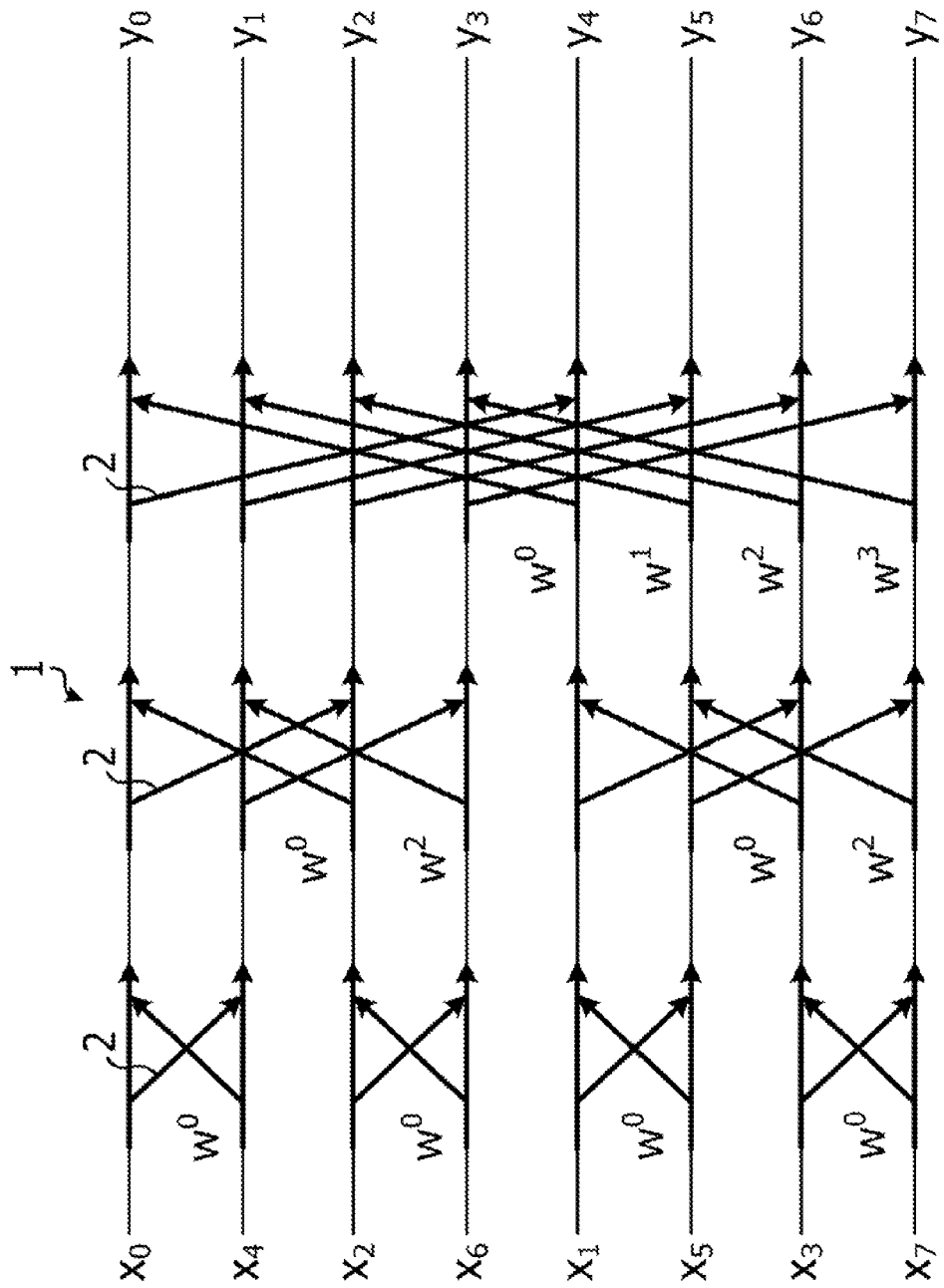
FIG. 1 is a pattern diagram illustrating an example of a Fast Fourier Transform circuit.

FIG. 1 is a pattern diagram illustrating an example of a Fast Fourier Transform (FFT) circuit. FIG. 1 illustrates an FFT circuit 1 in which FFT computation is performed by a number of elements 8 and a base 2, for example. The number of elements and the base are arbitrary. In FIG. 1, the circuit illustrated in a cross-coupled structure with arrows is a butterfly computation circuit 2 as a basis of the FFT computation. In this case, $w^0$ to $w^3$ indicate twiddle factors to be multiplied by an input signal of the butterfly computation circuit. The output signal of the butterfly computation circuit becomes an input signal of a next butterfly computation circuit. In general, if the number of elements is Nth power of 2, the input signal passes through the butterfly computation circuit N-times. Accordingly, if the number of elements is 8, the input signal passes through the butterfly computation circuit three times.

Figure 2:
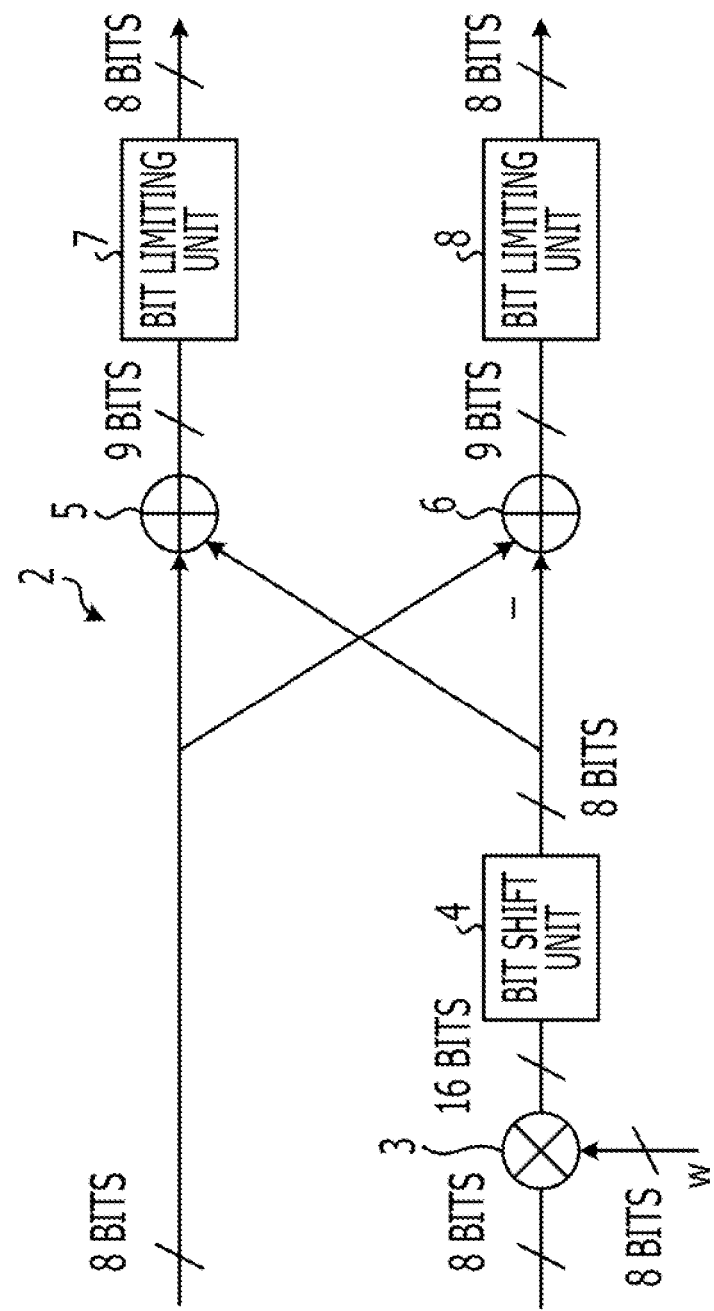
FIG. 2 is a block diagram illustrating an example of a butterfly computation circuit.

FIG. 2 is a block diagram illustrating an example of the butterfly computation circuit. For example, a description will be made of an example in which each of the input signal and the twiddle factor is 8 bits in a circuit in which the butterfly computation is performed by an integer of the limited number of bits. As illustrated in FIG. 2, in the butterfly computation circuit 2, a multiplying unit 3 multiplies a twiddle factor w (8 bits) by an input signal (8 bits). For the signal of 16 bits obtained by the multiplication, the lower 8 bits are deleted by a bit shift unit 4, so that the signal becomes a signal of 8 bits that is the same as the input signal. The output signal (8 bits) of the bit shift unit 4 is added to the other input signal (8 bits) by the addition unit 5. The subtracting unit 6 subtracts the output signal (8 bits) of the bit shift unit 4 from the other input signal (8 bits).

For an output signal (9 bits) of an adding unit 5 and an output signal (9 bits) of a subtracting unit 6, the upper 1 bit or the lower 1 bit is deleted by bit limiting units 7 and 8, respectively, so that the output signals becomes a signal of 8 bits that is the same as the input signal. The output signal (8 bits) of the bit limiting units 7 and 8 becomes an output signal of the butterfly computation circuit 2. After the addition and subtraction by the adding unit 5 and the subtracting unit 6, the amplitude of the signal is increased $\sqrt{2}$ times on average. Accordingly, if, for example, the lower 1 bit of the output signal of the adding unit 5 and the output signal of the subtracting unit 6 is deleted at a rate of one time in two times when the input signal passes through the butterfly computation circuit 2 in the FFT circuit, the amplitude returns to the original state, which is preferable. The deletion amount of bits in the bit shift unit 4 and the frequency of deletion of bits in the bit limiting units 7 and 8 appropriately varied based on the input signal.

First Embodiment

According to a first embodiment, the signal with the small power is left by subtracting the signal with the large power from the input signal and performs the FFT on the signal with the small power.

Figure 3:
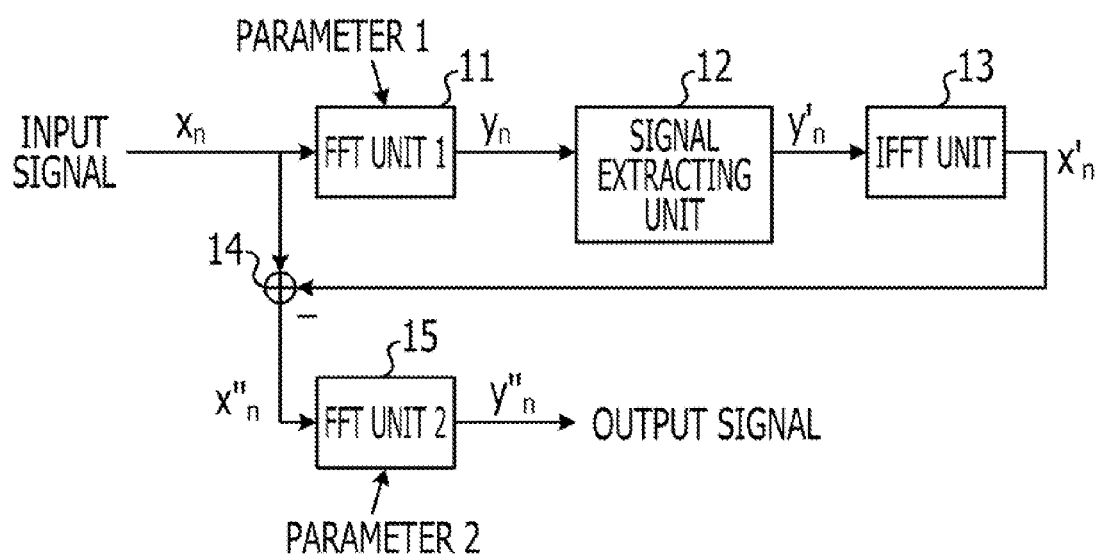
FIG. 3 is a block diagram illustrating a receiving device according to a first embodiment.

FIG. 3 is a block diagram illustrating a receiving device according the first embodiment. As illustrated in FIG. 3, the receiving device includes a first FFT unit 11, a signal extracting unit 12, an IFFT unit 13, a subtracting unit 14, and a second FFT unit 15. An input signal $x_n$ is stored in a memory such as a buffer that is not illustrated in the diagrams. For example, the input signal $x_n$ is adjusted to a level at which an output of the first FFT unit 11 is not saturated by an Automatic Gain Control (AGC) circuit that is not illustrated in the diagrams. The input signal $x_n$ is a signal of a multi-carrier transmitting method. An OFDM method and a Code Division Multiple Access (CDMA) method are examples of the multi-carrier transmitting method. In this case, the OFDM method will be described, for example.

The first FFT unit 11 (an FFT unit 1) performs the FFT on the input signal $x_n$ of a time domain based on a parameter 1 for bit limitation and outputs a plurality of signals $y_n$ of a frequency domain. The signal of each of the frequency domains is called a sub-carrier. In the first FFT unit 11, the parameter 1 for bit limitation determines the frequency of deletion of the lower 1 bit of the signal after being added and subtracted when the butterfly computation is performed as described above, for example. For example, the first FFT unit 11 may delete the lower 1 bit of the signal after being added and subtracted at a rate of one in two where the butterfly computation is performed.

The signal extracting unit 12 extracts the signal with the large power from the output signal $y_n$ of the first FFT unit 11. For example, the signal extracting unit 12 overwrites a value of the signal with a power that is not larger than a threshold value by 0, and the signal extracting unit 12 may maintain the value of the signal with a power that is larger than the threshold value. In this case, for the output signal $y'_n$ of the signal extracting unit 12, the value of the signal with the large power is as large as the original value, and the value of the signal with the small power becomes 0. Accordingly, the signal extracting unit 12 extracts the signal with the large power from the output signal $y_n$ of the first FFT unit 11. The threshold value may be set in advance.

The IFFT unit 13 performs IFFT on an output signal $y'_n$ of the signal extracting unit 12 to transform the signal into an output signal $x'_n$ of the time domain. The subtracting unit 14 subtracts the output signal $x'_n$ of the IFFT unit 13 from the input signal $x_n$. For an output signal $x''_n$ of the subtracting unit 14, the value of the signal with the small power is equivalent to the signal of the input signal $x_n$, so that the value of the signal with the large power becomes 0. Accordingly, the subtracting unit 14 deletes the signal with the large power from the input signal $x_n$.

The second FFT unit 15 (an FFT unit 2) performs the FFT on the output signal $x''_n$ of the subtracting unit 14 based on a parameter 2 for bit limitation and outputs an output signal $y''_n$ of the frequency domain. In the second FFT unit 15, the parameter 2 for bit limitation determines the frequency of deletion of the lower 1 bit of the signal after being added and subtracted when the butterfly computation is performed as described above, for example. After the addition and subtraction of the butterfly computation are performed, the second FFT unit 15 may allocate sufficient bits to the signal with the small power, for example, by decreasing the number of times of deleting the lower 1 bit of the signal. For example, if an amplitude ratio of the signal with the large power and the signal with the small power is approximately one-eighth, the number of times of deleting the lower 1 bit by the second FFT unit 15 may be decreased to be less than the number of times of deleting the lower 1 bit by the first FFT unit 11 by three. Consequently, the level of the output value of the second FFT unit 15 is increased approximately eight times, so that the sufficient bits are allocated to the signal with the small power. As a result, the accuracy is improved. The output signal $y''_n$ of the second FFT unit 15 is output to the circuit of the next stage, which is not illustrated, as the FFT result with respect to the input signal.

Figure 4:
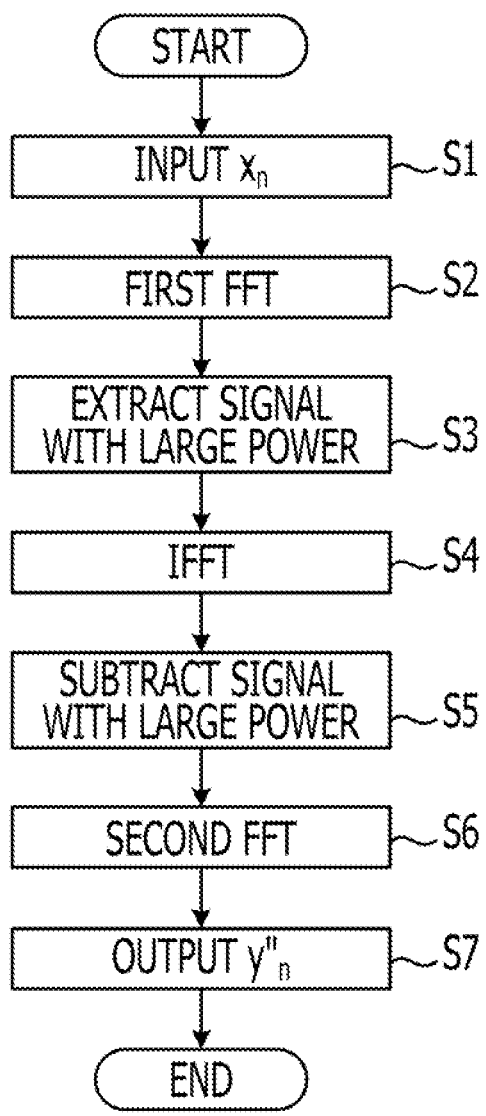
FIG. 4 is a flowchart illustrating a receiving method according to the first embodiment.

FIG. 4 is a flowchart illustrating a receiving method according to the first embodiment. As illustrated in FIG. 4, when the FFT processing on the reception signal is started, the receiving device receives the input signal $x_n$ of the time domain as a reception signal and stores the input signal $x_n$ in a memory such as a buffer (Operation S1). In the receiving device, the first FFT unit 11 performs first FFT on the input signal $x_n$ based on the parameter 1 for bit limitation to transform the input signal into a plurality of signals $y_n$ of the frequency domain (Operation S2). In the receiving device, the signal extracting unit 12 extracts, for example, signals which exceeds the threshold power and overwrites remaining signals by 0 in the output signal $y_n$ of the first FFT unit 11 to extract the signal with the large power (Operation S3).

In the receiving device, the IFFT unit 13 performs the IFFT on the output signal y'n of the signal extracting unit 12 to transform the output signal y'n into the signal $x'_n$ of the time domain (Operation S4). In the receiving device, the subtracting unit 14 subtracts the output signal $x'_n$ of the IFFT unit 13 from the input signal $x_n$ (Operation S5). In the receiving device, the second FFT unit 15 performs second FFT on the output signal $x''_n$ of the subtracting unit 14 based on the parameter 2 for bit limitation to transforms the output signal $x''_n$ into the signal $y''_n$ of the frequency domain (Operation S6). The receiving device outputs the output signal $y''_n$ of the second FFT unit 15 to the circuit of the next stage (Operation S7), and a sequence of the FFT processing ends.

In the circuit of the next stage of the second FFT unit 15, the FFT result with respect to the signal with the large power extracted in Operation S3 may be preferably used. In this case, the receiving device may overwrite the output signal $y''_n$ of the second FFT unit 15 by the value of the signal that was not overwritten by 0 in Operation S3. Accordingly, the FFT result with respect to the signal with the large power and the FFT result with respect to the signal with the small power are output to the circuit of the next stage.

According to the first embodiment, since the signal with the large power is not included in the signal subjected to the FFT when the FFT is performed on the signal with the small power, the sufficient bits may be allocated to the signal with the small power when the FFT is performed on the signal with the small power. Even if the sufficient bits are allocated to the signal with the small power when the FFT is performed, the number of bits used for the FFT on the signal with the large power is not typically increased. Conventionally, the number of bits used for the FFT is increased to allocate the sufficient bits to the signal with small power. According to the first embodiment, the number of bits desired for the FFT may be decreased. Furthermore, since the accuracy of the FFT on the signal with the small power becomes higher than the accuracy of the conventional technique, the FFT may be performed accurately both on the signal with the large power and the signal with the small power.

When software of the FFT is executed by a processor such as a Digital Signal Processor (DSP), the FFT is performed by 32 bits if, for example, the accuracy is not high enough when the FFT is performed by 16 bits. In this case, the FFT includes multiplying processing. Thus, the processing amount is increased four times, not simply two times. On the other hand, in the first embodiment, even though the FFT is performed three times, the number of bits used for the FFT is not typically increased.

Thus, the processing amount is increased less than four times. Furthermore, the first embodiment is applicable to Discrete Fourier Transform (DFT) and Fast Hadamard Transform (FHT) as well as the FFT. For example, the first embodiment is applicable to a CDMA method as an example of the transmitting method for performing the FHT.

Second Embodiment

According to a second embodiment, in addition to the first embodiment, an output to be output to the circuit of the next stage is selected based on a difference between the power of the signal with the large power and the power of the signal with the small power. Either the output signal $y_n$ of the first FFT unit 11 or the output signal $y''_n$ of the second FFT unit 15 is output to the circuit of the next stage.

Figure 5:
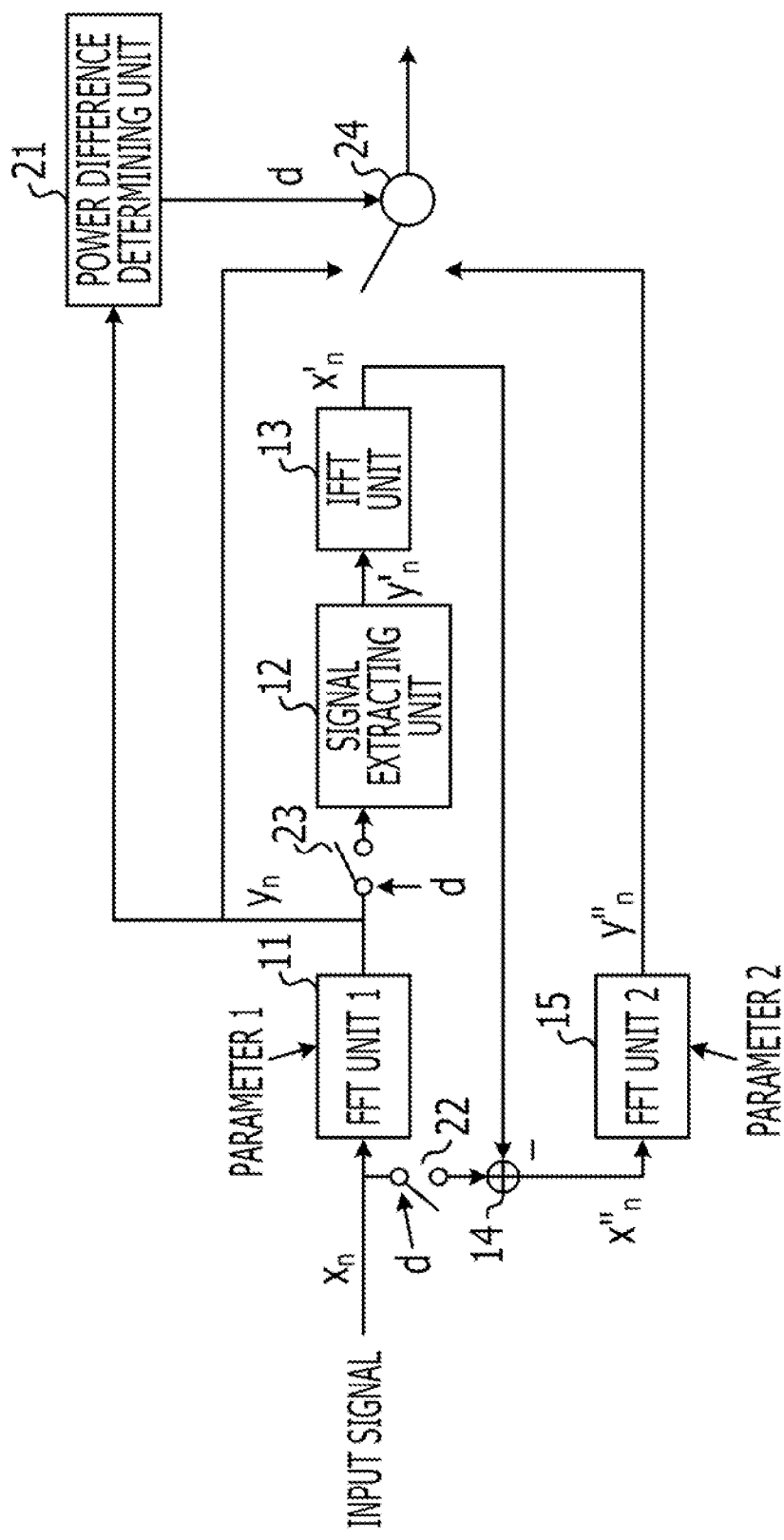
FIG. 5 is a block diagram illustrating a receiving device according to a second embodiment.

FIG. 5 is a block diagram illustrating a receiving device according to the second embodiment. As illustrated in FIG. 5, in addition to having the configuration of the first embodiment, the receiving device includes a power difference determining unit 21 and switches 22, 23, and 24 as selecting units. The power difference determining unit 21 determines a difference between the amount of the power of the signal with the large power and the amount of the power of the signal with the small power. For example, the power difference determining unit 21 may compare an average power B of the signal whose power exceeds the threshold value to an average power C of the signal whose power does not exceed the threshold value in the output signal $y_n$ of the first FFT unit 11. In this case, the threshold value is a reference used to extract the signal with the large power by the signal extracting unit 12 in the first embodiment.

If a ratio B/C is larger than the threshold value, the power difference determining unit 21 may determine that the power difference is large. If not, the power difference determining unit 21 may determine that the power difference is small. The threshold value as the reference used to determine the power difference is different from the threshold value as the reference used to extract the signal with the large power by the signal extracting unit 12 in the first embodiment. The threshold value as the reference to be used to determine the power difference may be set in advance.

If the power difference determining unit 21 determines that the power difference is larger than the threshold value, the first switch 22 allows the input signal $x_n$ to be input into the subtracting unit 14. If the power difference determining unit 21 determines that the power difference is smaller than the threshold value, the first switch 22 forbids the input signal $x_n$ to be input into the subtracting unit 14.

If the power difference determining unit 21 determines that the power difference is larger than the threshold value, the second switch 23 allows the output signal $y_n$ of the first FFT unit 11 to be input into the signal extracting unit 12. If the power difference determining unit 21 determines that the power difference is smaller than the threshold value, the second switch 23 forbids the output signal $y_n$ of the first FFT unit 11 to be input into the signal extracting unit 12.

If the power difference determining unit 21 determines that the power difference is larger than the threshold value, the third switch 24 outputs the output signal $y''_n$ of the second FFT unit 15 to the circuit of the next stage. If the power difference determining unit 21 determines that the power difference is smaller than the threshold value, the third switch 24 outputs the output signal $y_n$ of the first FFT unit 11 to the circuit of the next stage. The other configurations are substantially equivalent to the first embodiment.

Figure 6:
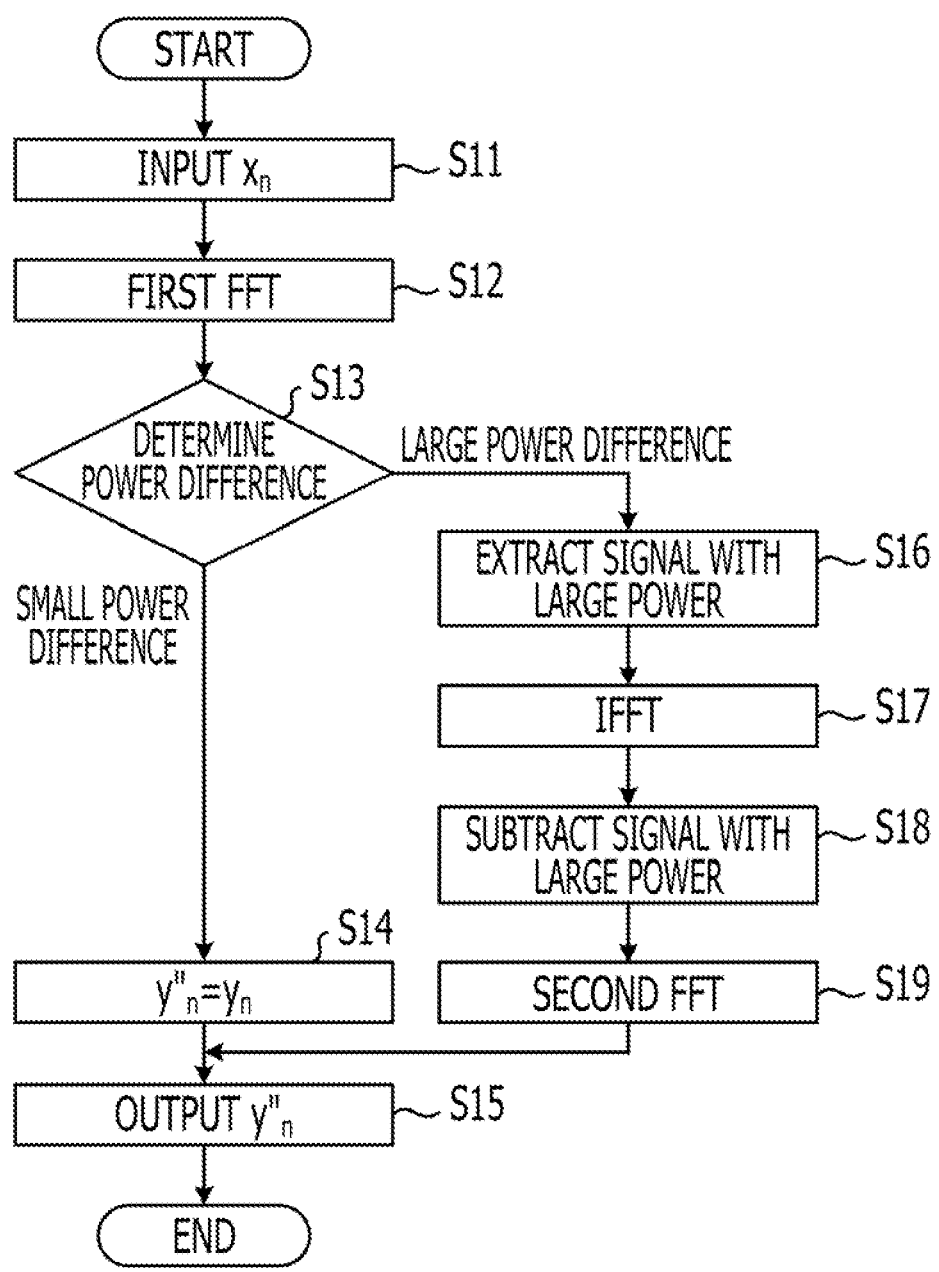
FIG. 6 is a flowchart illustrating a receiving method according to the second embodiment.

FIG. 6 is a flowchart illustrating a receiving method according to the second embodiment. As illustrated in FIG. 6, when the FFT processing on the reception signal is started, the receiving device performs the processing equivalent to Operations 1 and 2 according to the first embodiment (Operation S11 and Operation S12). In the receiving device, the power difference determining unit 21 determines the power difference (Operation S13). If the power difference determining unit 21 determines that the power difference is small (Small power difference in Operation S13), the receiving device has the output signal $y_n$ of the first FFT unit 11 as an output signal $y''_n$ to be output to the circuit of the next stage (Operation S14). The output signal $y''_n$ is output to the circuit of the next stage (Operation S15), and a sequence of the FFT processing ends.

On the other hand, if the power difference determining unit 21 determines that the power difference is larger than the threshold value (Large power difference in Operation S13), the receiving device performs the processing substantially equivalent to Operations S3 to S6 of the first embodiment (Operation S16 to Operation S19). The receiving device outputs the output signal y''$_n$ of the second FFT unit 15 (Operation S15), and the sequence of the FFT processing ends.

According to the second embodiment, the effect substantially equivalent to the first embodiment is achieved. If the power difference between the power of the signal with the large power and the power of the signal of the small power is not large, the processing by the signal extracting unit 12, the IFFT unit 13, the subtracting unit 14, and the second FFT unit 15 may be omitted. Thus, the processing amount may be reduced. The power difference between the power of the signal with the large power and the power of the signal with the small power is not limited to the ratio of the two powers thereof. For example, the power difference between the two powers thereof may be obtained.

Third Embodiment

According to a third embodiment, in addition to the first embodiment, an output to be output to the circuit of the next stage is selected based on the modulating method of a data channel. If the modulating method has a relatively small effect of a signal-to-noise ratio, the output signal y$_n$ of the first FFT unit 11 is output to the circuit of the next stage. If the modulating method has a relatively large effect of the signal-to-noise ratio, the output signal y''$_n$ of the second FFT unit 15 is output to the circuit of the next stage.

Figure 7:
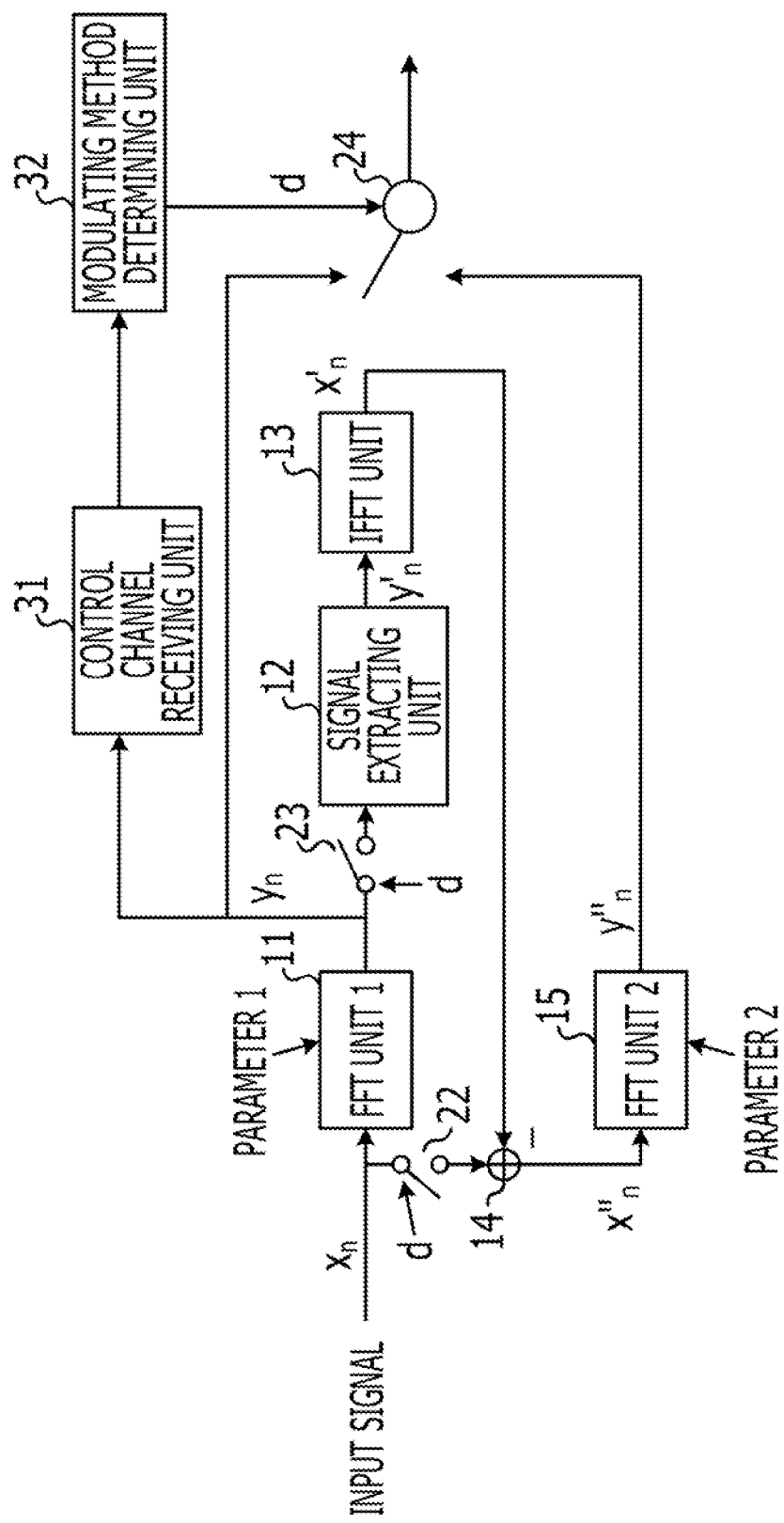
FIG. 7 is a block diagram illustrating a receiving device according to a third embodiment.

FIG. 7 is a block diagram illustrating a receiving device according to the third embodiment. As illustrated in FIG. 7, the receiving device includes a control channel receiving unit 31, a modulating method determining unit 32, and switches 22, 23, and 24 as selecting units in addition to the configuration of the first embodiment. The control channel receiving unit 31 demodulates and decodes, for example, a control channel from the output signal y$_n$ of the first FFT unit 11 to obtain information of the modulating method of the data channel. The control channel is allocated to a specific subcarrier or a specific timing. In adaptive coding and modulation, the modulating method may be reported by a control channel. The information of the modulating method may be obtained from the signal, which includes the information of the modulating method of the data channel, as well as the control channel.

Based on the information of the modulating method obtained by the control channel receiving unit 31, the modulating method determining unit 32 determines whether the modulating method of the data channel has the relatively small effect of the signal-to-noise ratio or the relatively large effect of the signal-to-noise ratio. For example, when Binary Phase Shift Keying (BPSK), Quadrature Phase Shift Keying (QPSK), 16 Quadrature Amplitude Modulation (16 QAM), and 64 Quadrature Amplitude Modulation (64 QAM) are compared to each other, the effect of the signal-to-noise becomes larger in order of the QPSK, the 16 QAM, and the 64 QAM. For example, the QPSK and the 16 QAM may be modulating methods that have the relatively small effect of the signal-to-noise ratio, and the 64 QAM may be a modulating method that has the relatively large effect of the signal-to-noise ratio.

If the modulating method determining unit 32 determines that the modulating method has the relatively large effect of the signal-to-noise ratio, the first switch 22 allows the input signal x$_n$ to be input into the subtracting unit 14. If the modulating method determining unit 32 determines that the modulating method has the relatively small effect of the signal-to-noise ratio, the first switch 22 forbids the input signal x$_n$ to be input into the subtracting unit 14.

If the modulating method determining unit 32 determines that the modulating method has the relatively large effect of the signal-to-noise-ratio, the second switch 23 allows the output signal y$_n$ of the first FFT unit 11 to be input into the signal extracting unit 12. If the modulating method determining unit 32 determines that the modulating method has the relatively small effect of the signal-to-noise ratio, the second switch 23 forbids the output signal y$_n$ of the first FFT unit 11 to be input into the signal extracting unit 12.

If the modulating method determining unit 32 determines that the modulating method has the relatively large effect of the signal-to-noise ratio, the third switch 24 outputs the output signal y''$_n$ of the second FFT unit 15 to the circuit of the next stage. If the modulating method determining unit 32 determines that the modulating method has the relatively small effect of the signal-to-noise ratio, the third switch 24 outputs the output signal y$_n$ of the first FFT unit 11 to the circuit of the next stage. The other configurations are substantially equivalent to the first embodiment.

Figure 8:
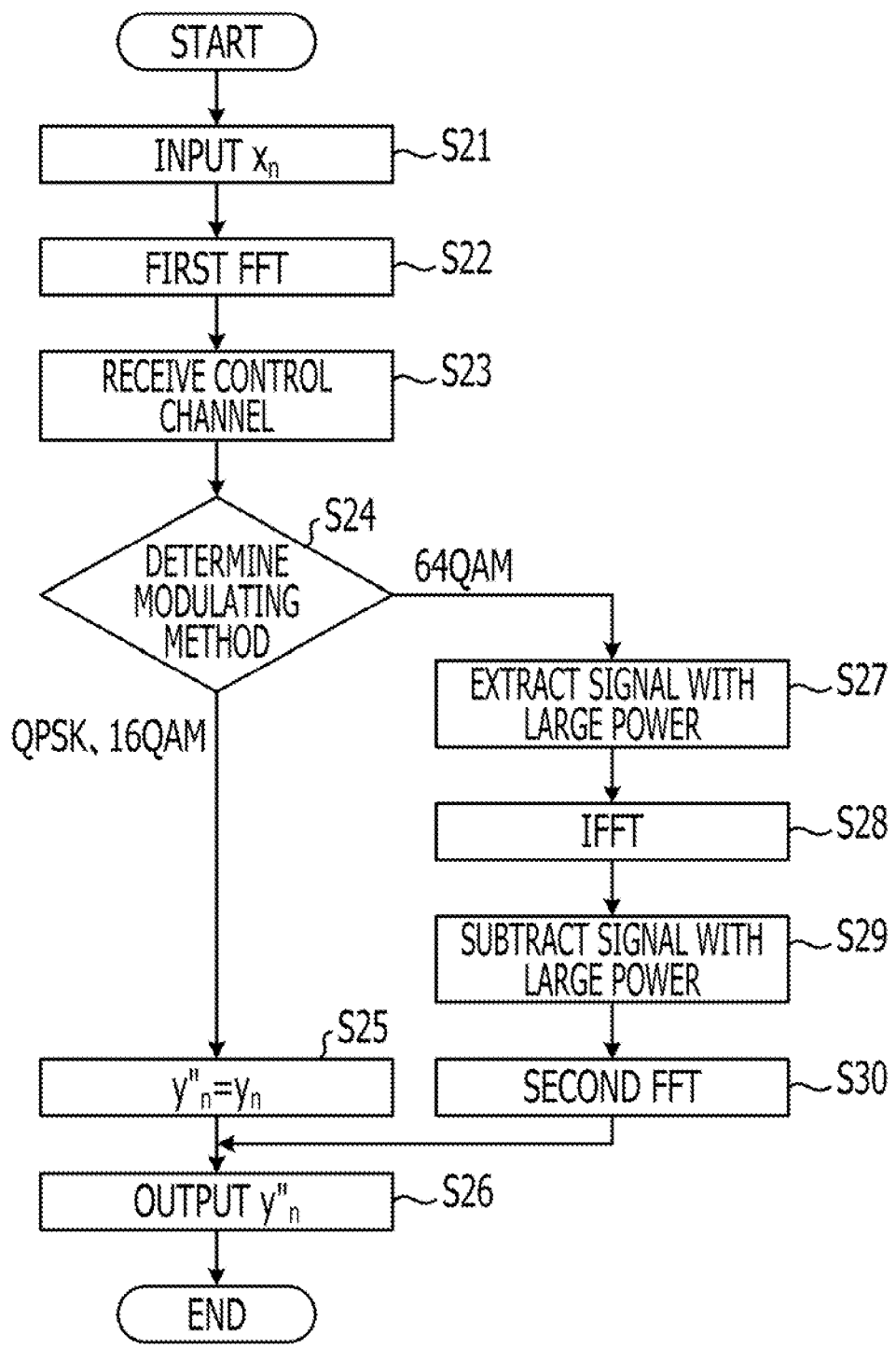
FIG. 8 is a flowchart illustrating a receiving method according to the third embodiment.

FIG. 8 is a flowchart illustrating a receiving method according to the third embodiment. As illustrated in FIG. 8, when the FFT processing on the reception signal is started, the receiving device firstly performs the processing substantially equivalent to Operations S1 and S2 of the first embodiment (Operation S21 and Operation S22). In the receiving device, the control channel receiving unit 31 demodulates and decodes, for example, the control channel to obtain the information of the modulating method of the data channel (Operation S23). In the receiving device, the modulating method determination unit 32 determines the modulating method of the data channel (Operation S24). If the modulating method determining unit 32 determines that the modulating method has the relatively small effect of the signal-to-noise, that is, if the modulating method is the QPSK or the 16 QAM, for example (OPSK, 16 QAM in Operation S24), the receiving device has the output signal y$_n$ of the first FFT unit 11 as the output signal y''$_n$ to be output to the circuit of the next stage (Operation S25). After that, the output signal y''$_n$ is output to the circuit of the next stage (Operation S26), and the sequence of the FFT processing ends.

On the other hand, if the modulating method determining unit 32 determines that the modulating has the relatively large effect of the signal-to-noise ratio, that is, if the modulating method is the 64 QAM, for example (64 QAM in Operation S24), the receiving device performs the processing substantially equivalent to Operations S3 to S6 (Operation S27 to Operation S30). The receiving device outputs the output signal y''$_n$ of the second FFT unit 15 (Operation S26), the sequence of the FFT processing ends.

According to the third embodiment, the effect substantially equivalent to the first embodiment is achieved. For the modulating method of data channel, if the effect of the signal-to-noise ratio is relatively small, the processing in the signal extracting unit 12, the IFFT unit 13, the subtracting unit 14, and the second FFT unit 15 may be omitted. Thus, the processing amount may be reduced.

Fourth Embodiment

According to a fourth embodiment, in addition to the first embodiment, the output signal y$_n$ of the first FFT unit 11 is demodulated and an output to be output to the circuit of the next stage is selected based on whether or not correct data may be obtained by performing error correction decoding. If the correct data is obtained by the error correction decoding, the output signal $y_n$ of the first FFT unit 11 is output to the circuit of the next stage. If the correct data is not obtained by the error correction decoding, the output signal $y''_n$ of the second FFT unit 15 is output to the circuit of the next stage.

Figure 9:
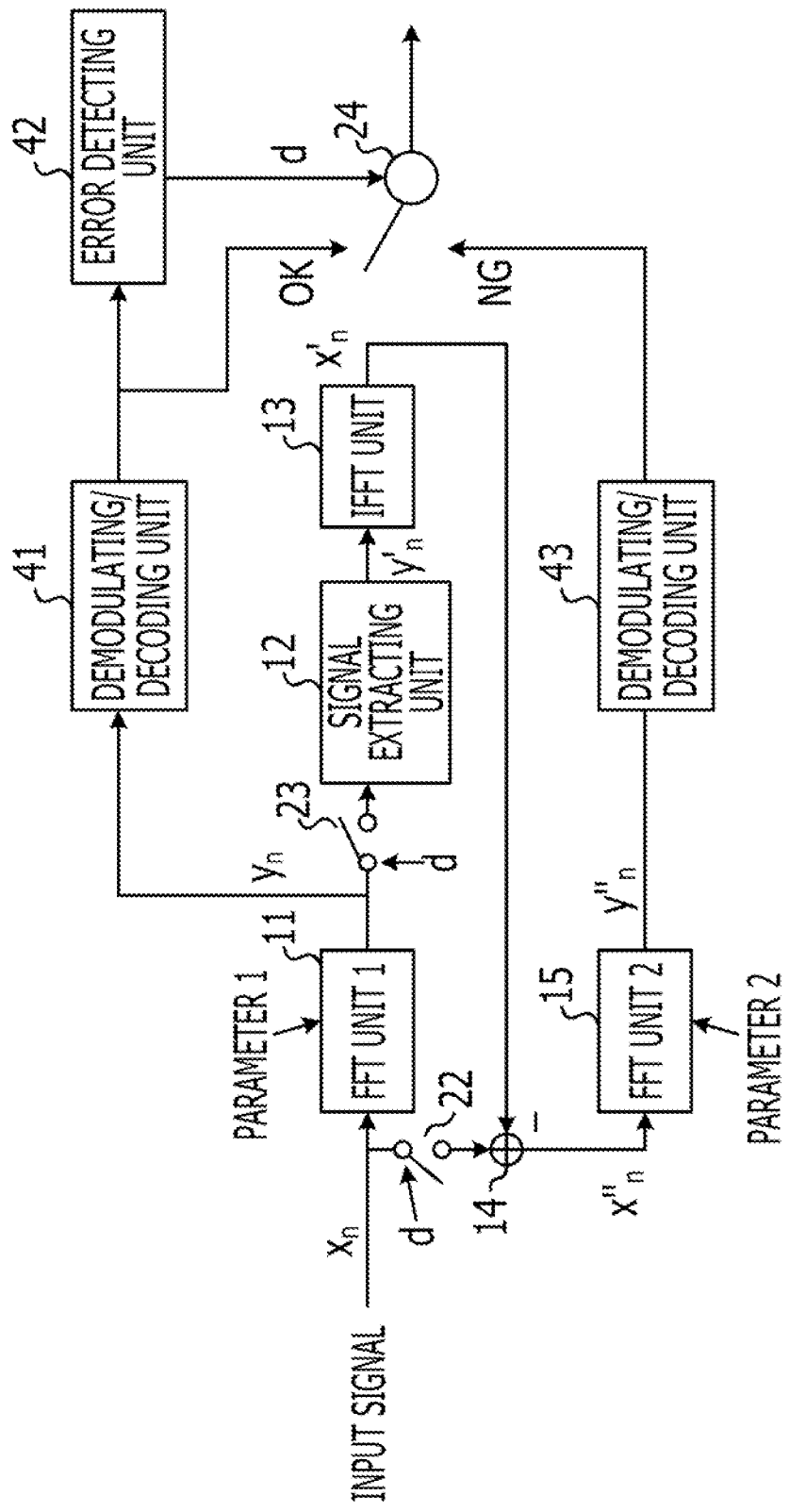
FIG. 9 is a block diagram illustrating a receiving device according to a fourth embodiment.

FIG. 9 is a block diagram illustrating a receiving device according to the fourth embodiment. As illustrated in FIG. 9, in addition to having the configuration of the first embodiment, the receiving device includes a demodulating/decoding unit 41, an error detecting unit 42, switches 22, 23, and 24 as selecting units. The demodulating/decoding unit 41 demodulates the output signal $y_n$ of the first FFT unit 11 and performs the error correction decoding. The error detecting unit 42 detects an error of the output signal of the demodulating/decoding unit 41. The error detecting unit 42 may detect an error by Cyclic Redundancy Check (CRC), for example. The error detecting unit 42 determines that there is no error if the correct data is obtained by the error correction decoding. The error detecting unit 42 determines that there is an error if the correct data is not obtained by the error correction decoding. The receiving device further includes a demodulating/encoding unit 43 that demodulates and error-correction decodes the output signal $y''_n$ of the second FFT unit 15.

If the error detecting unit 42 determines that there is an error, the first switch 22 allows the input signal $x_n$ to be input into the subtracting unit 14. If the error detecting unit 42 determines that there is no error, the first switch 22 forbids the input signal $x_n$ to be input into the subtracting unit 14.

If the error detecting unit 42 determines that there is an error, the second switch 23 allows the output signal $y_n$ of the first FFT unit 11 to be input into the signal extracting unit 12. If the error detecting unit 42 determines that there is no error, the second switch 23 forbids the output signal $y_n$ of the first FFT unit 11 to be input into the signal extracting unit 12.

If the error detecting unit 42 determines that there is an error, the third switch 24 demodulates and error-correction decodes the output signal $y''_n$ of the second FFT unit 15 by using the demodulating/decoding unit 43 and outputs the output signal $y'''_n$ to the circuit of the next stage. If the error detecting unit 42 determines that there is no error, the third switch 24 demodulates and error-correction decodes the output signal $y_n$ of the first FFT unit 11 by using the demodulating/decoding unit 41 and outputs the output signal $y_n$ to the circuit of the next stage. The other configurations are substantially equivalent to the first embodiment.

Figure 10:
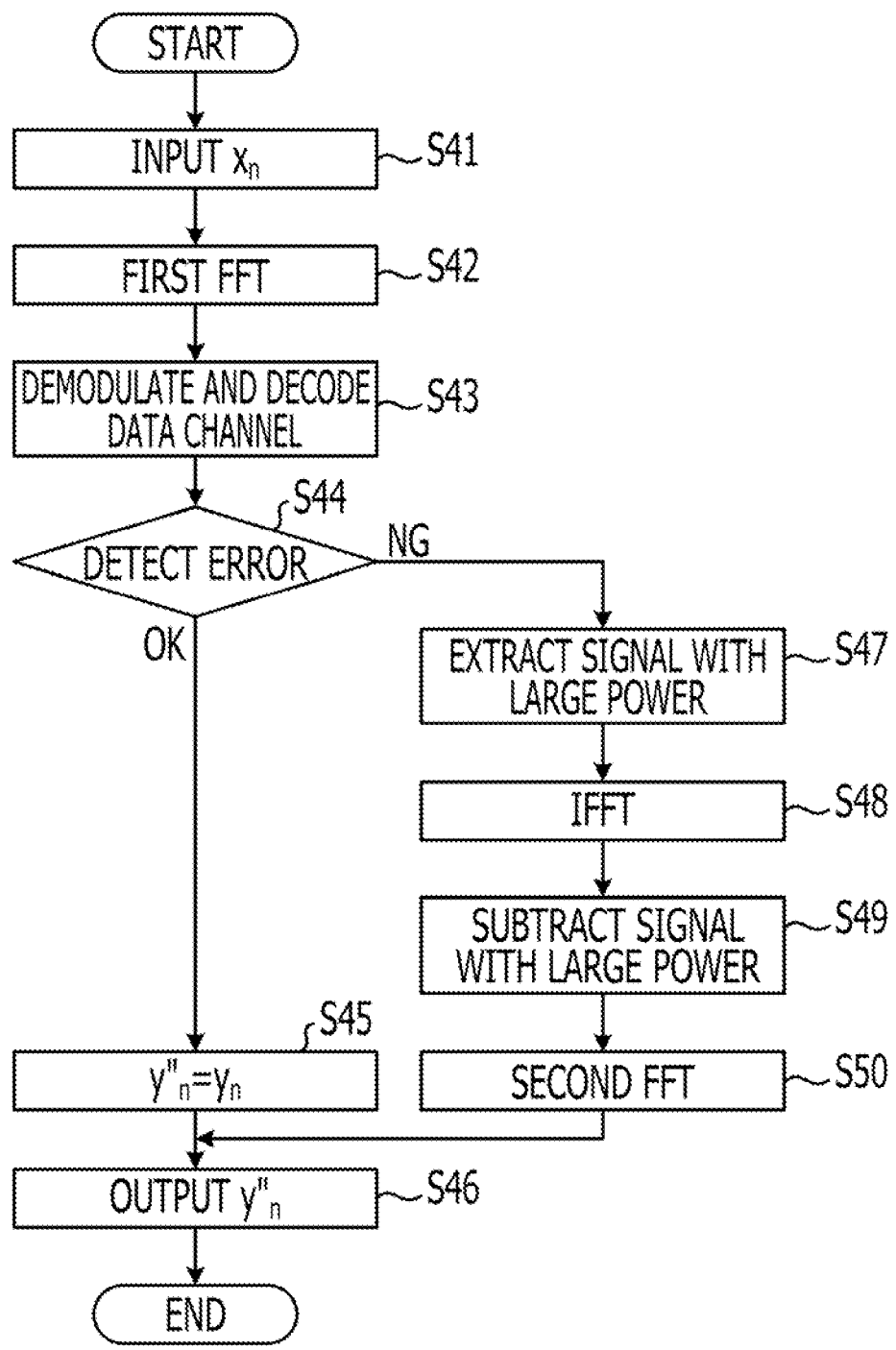
FIG. 10 is a flowchart illustrating a receiving method according to the fourth embodiment.

FIG. 10 is a flowchart illustrating a receiving method according to the fourth embodiment. As illustrated in FIG. 10, when the FFT processing on the reception signal is started, the receiving device firstly performs the processing substantially equivalent to Operation S1 and Operation S2 (Operation S41 and Operation S42). In the receiving device, the demodulating/decoding unit 41 demodulates and error-correction decodes the data channel included in the output signal $y_n$ of the first FFT unit 11 (Operation S43). In the receiving device, the error detecting unit 42 performs error detection on the data channel (Operation S44). If the error detection unit determines that there is no error (OK in Operation S44), the receiving device has the output signal $y_n$ of the first FFT unit 11 as the output signal $y''_n$ to be output to the circuit of the next stage (Operation S45). The output signal $y''_n$ (accurately, the output signal is demodulated and decoded by the demodulating/decoding unit 41) is output to the circuit of the next stage (Operation S46), and the sequence of the FFT processing ends.

On the other hand, if the error detecting unit 42 determines that there is an error (NG in Operation S44), the receiving device performs the processing substantially equivalent to Operations S3 to S6 of the first embodiment (Operation S47 to Operation S50). The receiving device outputs the output signal $y'''_n$ (accurately, the outputs signal is demodulated and decoded by the demodulating/decoding unit 43) of the second FFT unit 15 to the circuit of the next stage (Operation S46), and the sequence of the FFT processing ends.

According to the fourth embodiment, the effect substantially equivalent to the first embodiment is achieved. If the correct data is obtained by the error correction decoding, the processing of the signal extracting unit 12, the IFFT unit 13, the subtracting unit 14, and the second FFT unit 15 may be omitted. Thus, the processing amount may be reduced.

Fifth Embodiment

According to a fifth embodiment, in addition to the second embodiment, an amplitude of an output signal is adjusted so that the amplitude remains the same when the output signal $y_n$ of the first FFT unit 11 is output to the circuit of the next stage and when the output signal $y''_n$ of the second FFT unit 15 is output to the circuit of the next stage.

Figure 11:
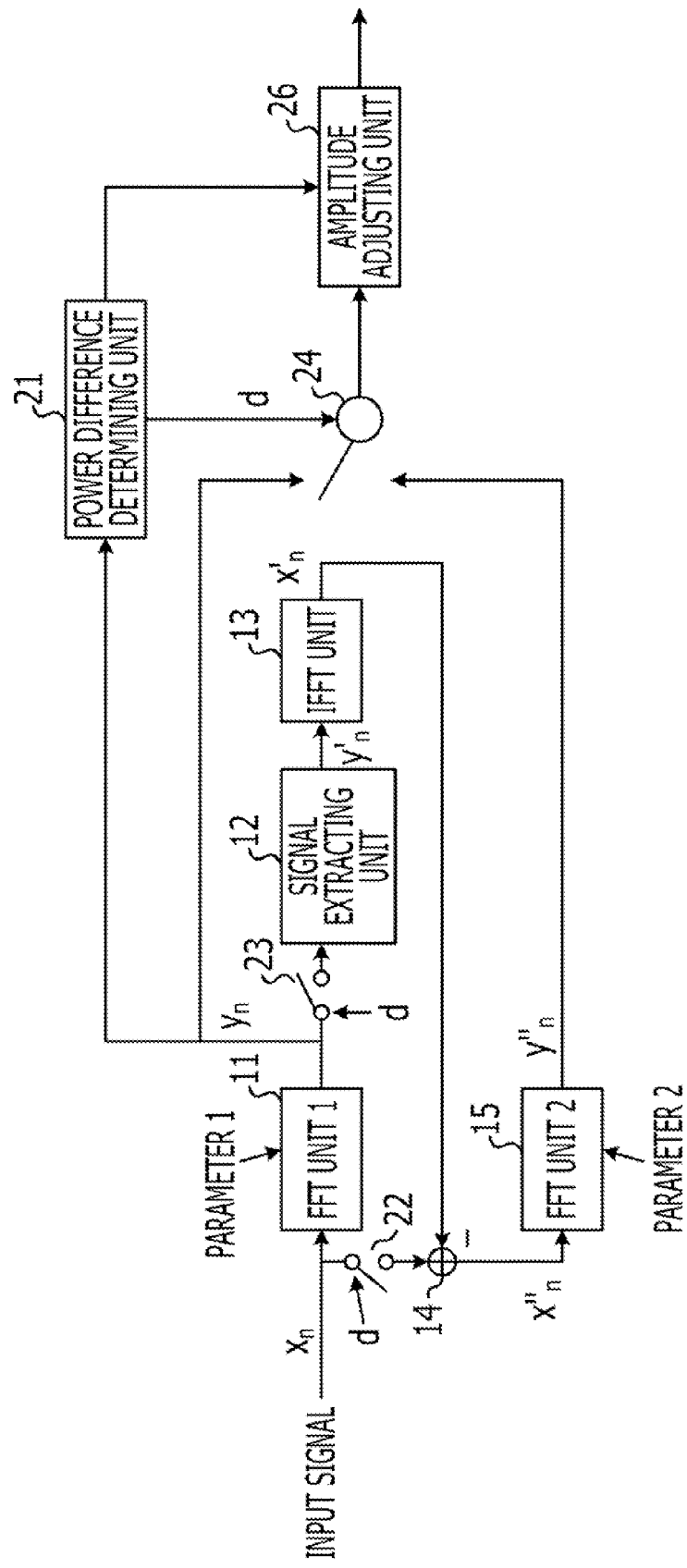
FIG. 11 is a block diagram illustrating a receiving device according to a fifth embodiment.

FIG. 11 is a block diagram illustrating a receiving device according to the fifth embodiment. As illustrated in FIG. 11, in addition to having the configuration of the second embodiment, the receiving device includes an amplitude adjusting unit 26. Based on determination by the power difference determining unit 21, the amplitude adjusting unit 26 multiplies the output signal by a constant and outputs the output signal to the circuit of the next stage. For example, if the power difference determining unit 21 determines that the power difference is small, the amplitude adjusting unit 26 may multiply the output signal $y_n$ of the first FFT unit 11 by the constant. For example, if the power difference determining unit 21 determines that the power difference is large, the amplitude adjusting unit 26 may multiply the output signal $y''_n$ of the second FFT unit 15 by the constant.

The constant number to be multiplied by the output signal by the amplitude adjusting unit 26 is determined based on the parameter 1 and the parameter 2 for bit limitation. For example, the number of times of deleting the lower 1 bit in the first FFT unit 11 by the parameter 1 is 5, and the number of times of deleting the lower 1 bit in the second FFT unit 15 by the parameter 2 is 2. In this case, the amplitude of the output signal $y''_n$ of the second FFT unit 15 is increased $2^{(5-2)}$ times, that is, eight times, as large as the original amplitude. Therefore, the amplitude adjusting unit 26 multiplies the output signal $y_n$ of the first FFT unit 11 by 8. The other configurations are substantially equivalent to the second embodiment.

Figure 12:
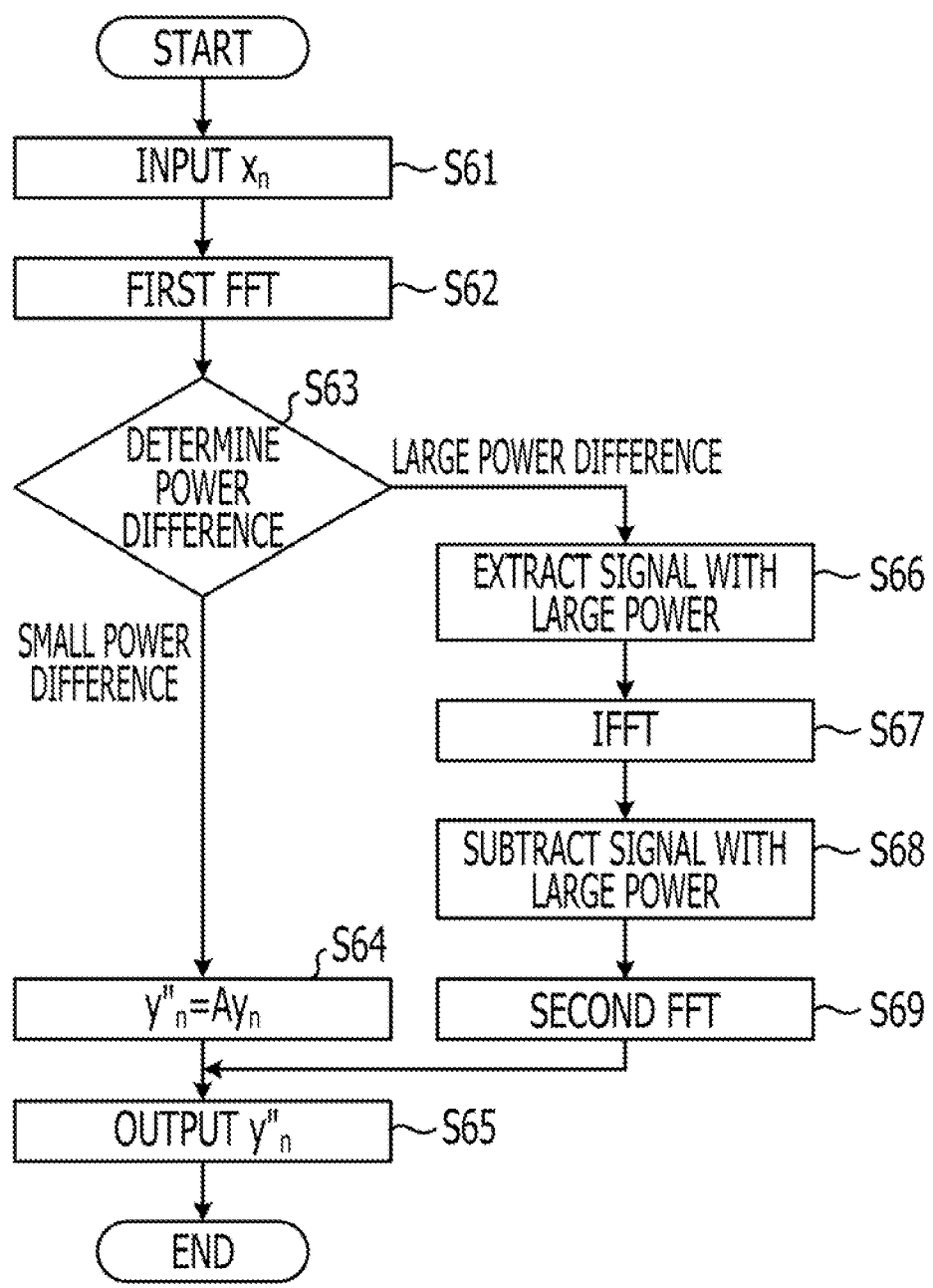
FIG. 12 is a flowchart illustrating a receiving method according to the fifth embodiment.

FIG. 12 is a flowchart illustrating a receiving method according to the fifth embodiment. As illustrated in FIG. 12, when the FFT processing on the reception signal is started, the receiving device performs the processing substantially equivalent to Operations S11 to S13 of the second embodiment (Operation S61 to Operation S63). If the power difference determining unit 21 determines that the power difference is small (Small power difference in Operation S63), the amplitude adjusting unit 26 outputs the output signal $y''_n$ to the circuit of the next stage by multiplying the output signal $y_n$ of the first FFT unit 11 by a constant A (Operation S64). The output signal $y''_n$ is output to the circuit of the next stage (Operation S65), and the sequence of the FFT processing ends.

On the other hand, if the power difference determination unit 21 determines that the power difference is large (Large power difference in Operation S63), the receiving device performs the processing substantially equivalent to Operations S16 to S19 (Operation S66 to Operation S69). The receiving device outputs the output signal y"$_n$ of the second FFT unit 15 to the circuit of the next stage (Operation S65), and the sequence of the FFT processing ends.

According to the fifth embodiment, the effect substantially equivalent to the second embodiment is achieved. The amplitude of the output signal remains the same when the output signal y$_n$ of the first FFT unit 11 is output to the circuit of the next stage and when the output signal y"$_n$ of the second FFT unit 15 is output to the circuit of the next stage. Accordingly, since bit determination may be performed accurately to calculate a likelihood of each of the bits based on the symbol of the 16 QAN or the 64 QAM in the circuit of the next stage, the circuit of the next stage may perform the demodulating and the decoding normally. In the third or fourth as well as in the fifth embodiment, the amplitude of the output signal may be adjusted.

Sixth Embodiment

According to a sixth embodiment, in addition to the first embodiment, wherein the large power corresponds to the pilot signal. The pilot signal may be transmitted by a power that is larger than the power of other signals.

Figure 13:
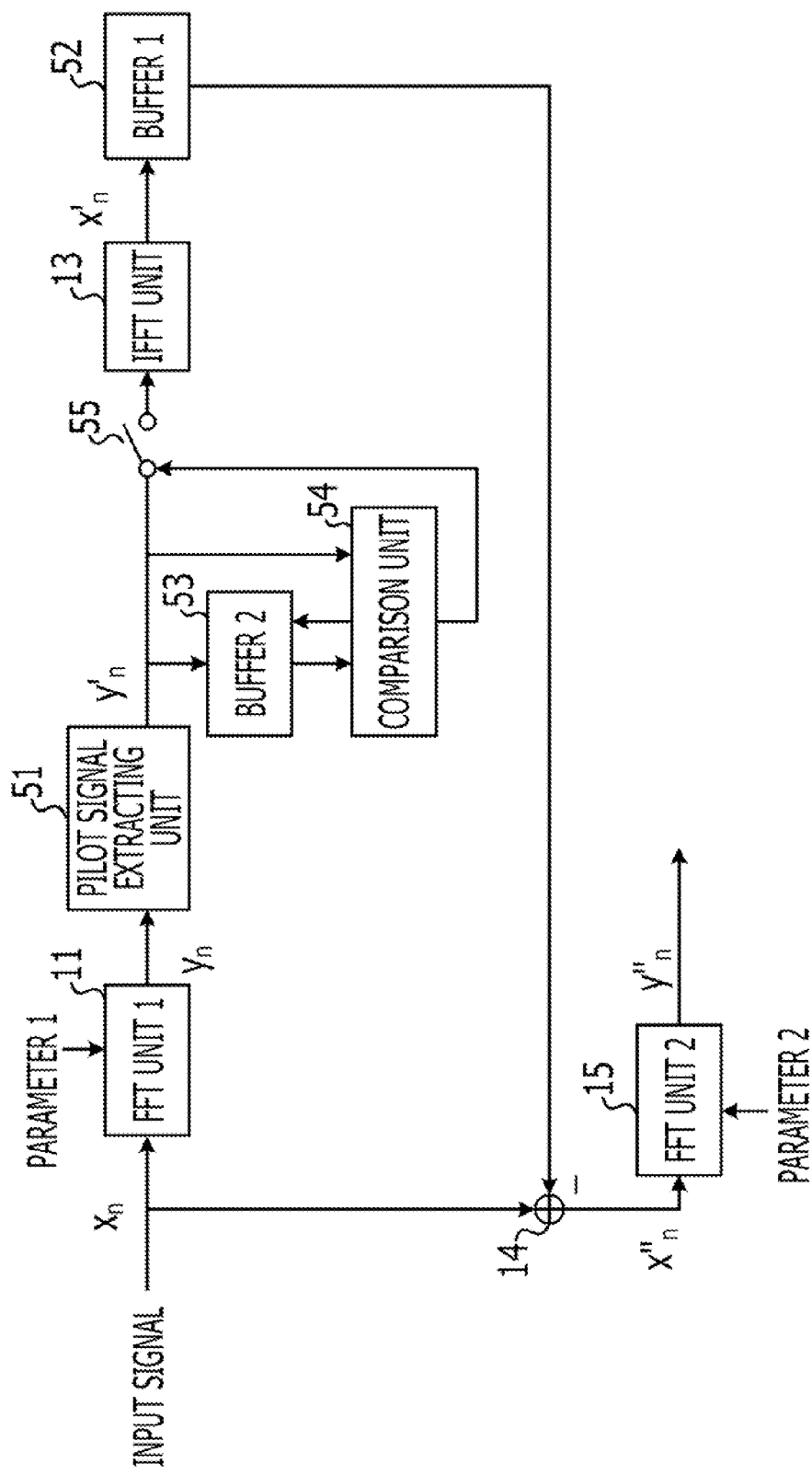
FIG. 13 is a block diagram illustrating a receiving device according to a sixth embodiment.

FIG. 13 is a block diagram illustrating a receiving device according to the sixth embodiment. As illustrated in FIG. 13, in the configuration of the first embodiment, the receiving device includes a pilot signal extracting unit 51 as a signal extracting unit. The pilot signal extracting unit 51 extracts the pilot signal from the output signal y$_n$ of the first FFT unit 11. For example, the pilot signal extracting unit 51 may extract the pilot signal by overwriting, by 0, the value of the signal other than the signals of the sub-carriers for pilot signal.

The IFFT unit 13 performs the IFFT on the output signal y'$_n$ of the pilot signal extracting unit 51. The receiving device includes a first buffer 52 as a buffer. The first buffer 52 stores the output signal x'$_n$ of the IFFT unit 13. The first buffer 52 stores the pilot signal. The subtracting unit 14 subtracts the pilot signal stored in the first buffer 52 from the input signal x$_n$.

The receiving device includes a second buffer 53, a comparison unit 54, and a switch 55. The second buffer 53 stores the pilot signal that is extracted at first by the pilot signal extracting unit 51. If a comparison result from the comparison unit 54 indicates that the power difference is large as described below, the second buffer 53 stores the latest pilot signal that is extracted by the pilot signal extracting unit 51. The comparison unit 54 compares the pilot signal stored in the second buffer 53 to the latest pilot signal extracted by the pilot signal extracting unit 51. For example, the comparison unit 54 obtains an average value of the power of the difference of the above-described two pilot signals. If the average value is larger than an appropriate reference value, the comparison unit 54 may determines that the difference is large. If the average value of the difference of the two pilot signals is not larger than the appropriate reference value, the comparison unit 54 may determine that the difference is small.

If the comparison unit 54 determines that the difference is large, the switch 55 allows the output signal y'$_n$ of the pilot signal extracting unit 51 to be input into the IFFT unit 13. If the comparison unit 54 determines that the difference is small, the switch 55 forbids the output signal y'$_n$ of the pilot signal extracting unit 51 to be input into the IFFT unit 13. The other configurations are substantially equivalent to the first embodiment.

Figure 14:
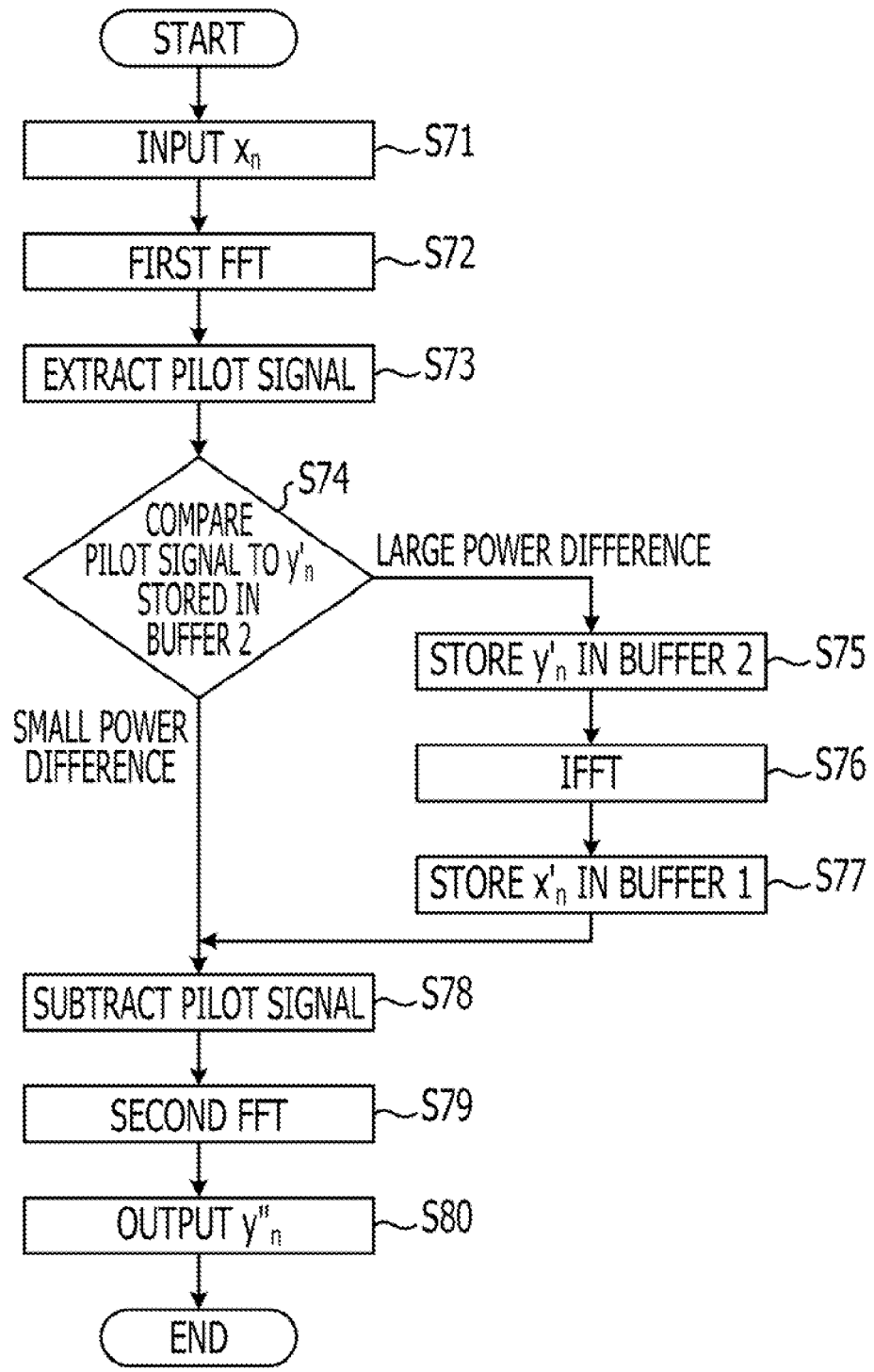
FIG. 14 is a flowchart illustrating a receiving method according to the sixth embodiment.

FIG. 14 is a flowchart illustrating a receiving method according to the sixth embodiment. As illustrated in FIG. 14, when the FFT processing on the reception signal is started, the receiving device performs the processing substantially equivalent to Operations S1 and S2 of the first embodiment (Operation S71 and Operation S72). The receiving unit extracts the pilot signal by overwriting, by 0, the value of the signal other than the signals of the sub-carriers for pilot signal (Operation S73). After the FFT processing on the reception signal is started, if the pilot signal extracting unit 51 extracts a first pilot signal, the receiving device stores the first pilot signal in the second buffer 53. In the receiving device, if the extracted pilot signal is a second or following pilot signal, the comparison unit 54 compares the latest pilot signal extracted by the pilot signal extracting unit 51 to the pilot signal stored in the second buffer 53 (Operation S74).

If the comparison unit 54 determines that the power difference is large (Large power difference in Operation S74), the receiving device stores the output signal y'$_n$ of the pilot signal extracting unit 51 as the latest pilot signal in the second buffer 53 (Operation S75). The IFFT unit 13 transforms the output signal y'$_n$ of the pilot signal detection unit 51 into a signal x'$_n$ of the time domain by performing the IFFT on the output signal y'$_n$ (Operation S76). The receiving device stores the output signal x'$_n$ of the IFFT unit 13 as a pilot signal in the first buffer 52 (Operation S77).

In the receiving device, the subtracting unit 14 subtracts the pilot signal, which is stored in the first buffer 52, from the input signal x$_n$ (Operation S78). The receiving device performs the processing substantially equivalent to Operations S6 and S7 of the first embodiment (Operation S79 and Operation S80), and the sequence of the FFT processing ends. On the other hand, based on the comparison result from the comparison unit 54, if the difference between the two pilot signals is determined to be small (Small power difference in Operation S74), the processing from Operation S75 to Operation S77 is omitted. The receiving device performs the processing from Operation S78 to Operation S80, and the sequence of the FFT processing ends. Even though the pilot signal has a fixed value in most cases, the received pilot signal may be varied according to a change of a transmission environment. In the processing from Operation S75 to Operation S77, the pilot signal to be subtracted by the subtracting unit 14 is updated if the power difference between the received pilot signal and the pilot signal that was received earlier becomes larger after the received pilot signal was changed.

When the FFT result with respect to the pilot signal is output to the circuit of the next stage of the second FFT unit 15, the receiving device may overwrite the value of the signal, which was not overwritten by 0 in Operation S73, with respect to the output signal y"$_n$ of the second FFT unit 15. As a result, the FFT result with respect to the pilot signal and the FFT result with respect to the signal other than the pilot signal are output to the circuit of the next stage.

According to the sixth embodiment, regarding the pilot signal, the effect substantially equivalent to the first embodiment is achieved. Therefore, the receiving device used in the mobile radio communication system may decrease an interference of a synchronization signal. The subtracting unit 14 subtracts the pilot signal stored in the first buffer 52. If the received pilot signal is not considerably changed, the processing by the IFFT unit 13 may be omitted. Thus, the processing amount may be reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A receiving device comprising:
   a first Fast Fourier Transform (FFT) circuit which performs FFT on an input signal of a time domain to transform the input signal into a plurality of signals of frequency domains and outputs the plurality of signals of the frequency domains;
   a signal extracting circuit which extracts a signal with a power that is greater than a threshold value from among the plurality of signals of the frequency domains output from the first FFT circuit and outputs the extracted signal;
   an Inverse Fast Fourier Transform (IFFT) circuit which performs IFFT on the extracted signal having a power that is greater than the threshold value and being output from the signal extracting circuit;
   a subtracting circuit which subtracts the extracted signal output from the IFFT circuit from the input signal and outputs a subtracted signal; and
   a second FFT circuit which transforms the subtracted signal output from the subtracting circuit into a signal of the frequency domain by performing the FFT on the subtracted signal output from the subtracting circuit.

2. The receiving device according to claim 1, further comprising:
   a power difference determining circuit which determines a difference between an amount of power of one of the plurality of signals of the frequency domains that is greater than the threshold value and an amount of power of one of the plurality of signals of the frequency domains that is less than or equal to the threshold value; and
   a selecting circuit which selects either the extracted signal output from the first FFT circuit or the subtracted signal output from the second FFT circuit based on a determination result from the power difference determining circuit and outputs the selected signal as an FFT result.

3. The receiving device according to claim 2, wherein the selecting circuit selects the subtracted output signal of the second FFT circuit when the power difference determining circuit determines that the difference is greater than the threshold value, selects the extracted signal output from the first FFT circuit when the power difference determining circuit determines that the difference is less than or equal to the threshold value, and outputs the selected signal as the FFT result.

4. The receiving device according to claim 1, further comprising:
   a modulating method determining circuit which determines a modulating method of the input signal based on a signal that includes information of the modulating method of the input signal; and
   a selecting circuit which selects either the extracted signal output from the first FFT circuit or the subtracted signal output from the second FFT circuit based on a determination result from the modulating method determining circuit and outputs the selected signal as an FFT result.

5. The receiving device according to claim 4, wherein the selecting circuit selects the subtracted signal output from the second FFT circuit when the modulating method determining circuit determines that an effect of a signal-to-noise ratio is relatively large among a plurality of modulating methods, selects the extracted signal output from the first FFT circuit when the modulating method determining circuit determines that the effect of the signal-to-noise ratio is relatively small among the plurality of modulating methods, and outputs the output signal as the FFT result.

6. The receiving device according to claim 1, further comprising:
   a demodulating/decoding circuit which demodulates and decodes the extracted signal output from the first FFT circuit;
   an error detecting circuit which detects whether there is an error in a decoding result from the modulating/decoding circuit; and
   a selecting circuit which selects either the extracted signal output from the first FFT circuit or the subtracted signal output from the second FFT circuit based on a detection result from the error detecting circuit and outputs the output signal as an FFT result.

7. The receiving device according to claim 6, wherein the selecting circuit selects the subtracted signal output from the second FFT circuit when the error detecting circuit determines that there is an error in the decoding result from the demodulating/decoding circuit, selects the extracted signal output from the first FFT circuit when the error detecting circuit determines that there is no error in the decoding result, and outputs the output signal as the FFT result.

8. The receiving device according to claim 2, comprising an amplitude adjusting circuit which adjusts an amplitude of the output signal of the selecting circuit so that the amplitude of the output signal of the selecting remains the same when the selecting circuit outputs the extracted signal output from the first FFT circuit as the FFT result and when the selecting circuit outputs the subtracted signal output from the second FFT circuit as the FFT result.

9. A receiving device comprising:
   a first Fast Fourier Transform (FFT) circuit which transforms an input signal of a time domain into a signal of a frequency domain by performing FFT on the input signal and outputs the signal of the frequency domain;
   a pilot signal extracting circuit which extracts a pilot signal from a plurality of frequency domains output from the first FFT circuit and outputs the pilot signal;
   an Inverse Fast Fourier Transform (IFFT) circuit which transforms the pilot signal into a signal of the time domain by performing IFFT on the pilot signal and outputs an IFFT signal;
   a buffer which stores the IFFT signal output from the IFFT circuit;
   a subtracting circuit which subtracts an IFFT signal stored in the buffer from the input signal and outputs a subtracted signal;
   a second FFT circuit which transforms the subtracted signal output from the subtracting circuit into a signal of a frequency domain by performing the FFT on the subtracted signal output from the subtracting circuit; and
   a comparison circuit which compares a second pilot signal included in the input signal to a first pilot signal which is extracted before the second pilot signal,
   wherein the IFFT circuit transforms the second pilot signal into a signal of the time domain by performing the IFFT on the second pilot signal based on a comparison result from the comparison circuit, and
   wherein the buffer stores the second pilot signal that is subjected to the IFFT by the IFFT circuit.

10. A receiving method performed by a receiving device, comprising:

transforming an input signal of a time domain into a plurality of signals of a frequency domain by performing Fast Fourier Transform (FFT) on the input signal of the time domain;

extracting a signal with a power that is greater than a threshold value from among the plurality of signals of the frequency domain;

transforming the extracted signal into a signal of the time domain by performing Inverse Fast Fourier Transform (IFFT) on the extracted signal having a power that is greater than the threshold value;

subtracting a signal of the time domain from the input signal;

transforming the subtracted signal into a signal of the frequency domain by performing the FFT on the subtracted signal; and outputting the signal of the frequency domain as an FFT result.

11. A receiving method performed by a receiving device, comprising:

transforming an input signal of a time domain into a plurality of signals of a frequency domain by performing Fast Fourier Transform (FFT) on the input signal;

extracting a first pilot signal from among the plurality of the signals of the frequency domain;

transforming the extracted first pilot signal into a signal of a time domain by performing Inverse Fast Fourier Transform (IFFT) on the extracted pilot signal;

storing the signal of the time domain in a buffer;

subtracting the signal stored in the buffer from the input signal;

transforming the subtracted signal into the signal of the frequency domain by performing the FFT on the subtracted signal;

outputting the signal of the frequency domain as an FFT result;

comparing a second pilot signal included in the input signal to the first pilot signal which is extracted before the second pilot signal;

performing IFFT on the second pilot signal based on a comparison result from the comparing process to transform the second pilot signal into the signal of the time domain; and storing the second pilot signal which is subjected to the IFFT in a buffer.

* * * * *